United States Patent
Rehborn et al.

(10) Patent No.: US 11,951,985 B2
(45) Date of Patent: Apr. 9, 2024

(54) METHOD FOR DETERMINING A SET SPEED OF AN ASSISTANCE SYSTEM FOR CONTROLLING A LONGITUDINAL MOVEMENT OF A VEHICLE

(71) Applicant: DAIMLER AG, Stuttgart (DE)

(72) Inventors: Hubert Rehborn, Sindelfingen (DE); Verena Hesse, Stuttgart (DE); Micha Koller, Pliezhausen (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 302 days.

(21) Appl. No.: 17/595,990

(22) PCT Filed: Apr. 28, 2020

(86) PCT No.: PCT/EP2020/061668
§ 371 (c)(1),
(2) Date: Dec. 1, 2021

(87) PCT Pub. No.: WO2020/244847
PCT Pub. Date: Dec. 10, 2020

(65) Prior Publication Data
US 2022/0297689 A1 Sep. 22, 2022

(30) Foreign Application Priority Data
Jun. 3, 2019 (DE) .................. 10 2019 003 892.4

(51) Int. Cl.
*B60W 30/14* (2006.01)
*G08G 1/01* (2006.01)
(52) U.S. Cl.
CPC ......... *B60W 30/143* (2013.01); *G08G 1/0133* (2013.01); *B60W 2555/00* (2020.02)

(58) Field of Classification Search
CPC ............... B60W 30/14; B60W 30/143; B60W 2555/00; G08G 1/0133
(Continued)

(56) References Cited

U.S. PATENT DOCUMENTS 8,909,463 B2* 12/2014 Chapman ............. G08G 1/0129
701/119
8,924,077 B2* 12/2014 Yamada ............. G08G 1/09675
701/36
(Continued)

FOREIGN PATENT DOCUMENTS

DE 102005045891 B3 2/2007
DE 102008041174 A1 2/2010
(Continued)

OTHER PUBLICATIONS

International Search Report dated Aug. 7, 2020 in related/corresponding International Application No. PCT/EP2020/061668.
(Continued)

*Primary Examiner* — Atul Trivedi
(74) *Attorney, Agent, or Firm* — PATENT PORTFOLIO BUILDERS PLLC (57) ABSTRACT

A method for determining a set speed of an assistance system for controlling a longitudinal movement of a vehicle involves checking a route ahead of the vehicle with a predefined total route length to determine whether, on this total route length, there are areas with a free-flowing traffic state, areas with a slow-moving and/or congested traffic state, and areas with a gridlocked traffic state. A route length of each area is determined. Depending upon these determinations, it is decided whether the set speed is to be defined by the assistance system and to which of multiple predefined speed values the set speed is to be set.

10 Claims, 4 Drawing Sheets

(58) Field of Classification Search
USPC .......................................................... 701/93
See application file for complete search history.

(56) References Cited

U.S. PATENT DOCUMENTS

| | | | | |
|---|---|---|---|---|
| 9,014,954 | B2 * | 4/2015 | Sato | G08G 1/00 |
| | | | | 701/118 |
| 9,805,601 | B1 * | 10/2017 | Fields | G08G 1/0129 |
| 10,081,360 | B2 | 9/2018 | Hu et al. | |
| 2013/0041548 | A1 * | 2/2013 | Krautter | G08G 1/166 |
| | | | | 701/25 |
| 2014/0278074 | A1 * | 9/2014 | Annapureddy | G01C 21/36 |
| | | | | 701/533 |
| 2016/0153804 | A1 * | 6/2016 | Fowe | G01C 21/3697 |
| | | | | 701/119 |
| 2016/0189544 | A1 * | 6/2016 | Ricci | G08G 1/096725 |
| | | | | 701/117 |
| 2016/0225259 | A1 * | 8/2016 | Harris | H04W 28/0247 |
| 2017/0015319 | A1 * | 1/2017 | Knoller | B60W 50/0097 |
| 2017/0337810 | A1 * | 11/2017 | Abe | G01C 21/3492 |
| 2018/0113477 | A1 * | 4/2018 | Rodriguez | G05D 1/0061 |
| 2018/0233042 | A1 * | 8/2018 | Zhang | G08G 1/096791 |
| 2018/0335781 | A1 * | 11/2018 | Chase | G08G 1/0145 |
| 2019/0039613 | A1 * | 2/2019 | Lee | G08G 1/167 |
| 2019/0250639 | A1 * | 8/2019 | Xu | G08G 1/0133 |
| 2020/0258381 | A1 * | 8/2020 | Fowe | G08G 1/0112 |
| 2020/0398835 | A1 | 12/2020 | Graf et al. | |
| 2021/0229804 | A1 * | 7/2021 | Gu | G08G 5/0078 |
| 2021/0356279 | A1 * | 11/2021 | Szigeti | G01C 21/3407 |
| 2022/0297719 | A1 * | 9/2022 | Mittal | G08G 1/0133 |
| 2023/0033672 | A1 * | 2/2023 | Nayak | G08G 1/0175 |
| 2023/0154332 | A1 * | 5/2023 | Nayak | G08G 1/096716 |
| | | | | 701/301 |

FOREIGN PATENT DOCUMENTS

| | | | | |
|---|---|---|---|---|
| DE | 102009059128 | A1 | 6/2011 | |
| DE | 102012216875 | A1 | 3/2014 | |
| DE | 102012218100 | A1 * | 4/2014 | ........... B60W 10/04 |
| DE | 102015006411 | A1 | 2/2016 | |
| DE | 102017205893 | A1 | 10/2017 | |
| DE | 102016218287 | A1 | 3/2018 | |
| DE | 102017214573 | A1 | 3/2018 | |
| DE | 102017220420 | B3 | 4/2019 | |
| EP | 4270352 | A1 * | 11/2023 | ........... G08G 1/0112 |
| FR | 3110998 | A1 * | 12/2021 | |
| KR | 20190007287 | A * | 1/2019 | .......... B60W 50/035 |
| WO | WO-2016037765 | A1 * | 3/2016 | ............ B60W 10/04 |
| WO | WO-2020036607 | A1 * | 2/2020 | ...... B60W 30/18154 |

OTHER PUBLICATIONS

Office Action created Jan. 28, 2020 in related/corresponding DE Application No. 10 2019 003 892.4.

Written Opinion dated Aug. 7, 2020 in related/corresponding International Application No. PCT/EP2020/061668.

* cited by examiner

METHOD FOR DETERMINING A SET SPEED OF AN ASSISTANCE SYSTEM FOR CONTROLLING A LONGITUDINAL MOVEMENT OF A VEHICLE

BACKGROUND AND SUMMARY OF THE INVENTION

Exemplary embodiments of the invention relate to a method for determining a set speed of an assistance system for controlling a longitudinal movement of a vehicle.

Methods for determining a set speed for assistance systems for controlling the longitudinal movement of vehicles, for example for speed control systems, are generally known from the prior art. Such assistance systems are available on the market in various designs: as cruise control and as adapted cruise control. In these assistance systems, the set speed is a desired set speed to which the speed of the vehicle is to be controlled. In cruise control, the speed of the vehicle is constantly controlled to the set speed. The cruise control does not account for the traffic situation ahead of the vehicle. The vehicle driver is therefore responsible for maintaining the distance to vehicles ahead. By contrast, adaptive cruise control, also referred to as an ACC system, also takes the traffic situation ahead of the vehicle into account. It controls the speed of the vehicle to the set speed, provided it is possible to maintain the set speed without falling below a specifiable target distance to a vehicle ahead. If the vehicle ahead does not allow the set speed to be maintained, the control is carried out as a distance control in which the vehicle follows the vehicle ahead at the predefined target distance. The speed of the vehicle is thus adapted to the speed of the vehicle ahead.

In the known assistance systems, the set speed is usually predefined by the vehicle driver. However, assistance systems are also known which, for example, detect areas having a limited permissible maximum speed by means of road sign recognition or on the basis of digital map data and adjust the set speed to the permissible maximum speed in order to avoid exceeding the speed limit inadmissibly. Such an assistance system is known, for example, from DE 10 2015 006 411 A1.

From the prior art, as described in DE 10 2009 059 128 A1, a method for determining the traffic state in a vehicle is known. In this method, location information is obtained by means of a road map and a positioning device, traffic information is determined by means of a traffic information receiver, the route to a destination is determined based on the location information, the road map, and the traffic information, and route forecast information is determined cyclically therefrom. Based on the route forecast information, the route is divided into route sections having individual traffic states. An item of route segment information is assigned to each route segment, and each item of route segment information contains an item of traffic state information as well as an item of location information of the route segment. The route segment information is output.

Exemplary embodiments of the invention are directed to a method that is improved, compared to the prior art, for determining a set speed of an assistance system for controlling a longitudinal movement of a vehicle.

In a method according to the invention for determining a set speed of an assistance system for controlling a longitudinal movement of a vehicle, a route ahead of the vehicle with a predefined total route length is checked to determine whether, on this total route length, there are one or more areas with a "free-flowing traffic" traffic state, one or more areas with a "slow-moving and/or congested traffic" traffic state, and one or more areas with a "gridlocked traffic" traffic state, and a route length of each area is determined. Depending on this, a decision is made, in particular an automatic decision, as to whether the set speed is to be defined by the assistance system, and, if so, to which of multiple predefined speed values the set speed is to be set. By means of this method, it is determined, in particular, whether a set speed is required on the route ahead, and, if so, which of multiple predefined speed values of the set speed is required. Advantageously, a corresponding instruction is then transmitted to the assistance system, in particular if the latter is to define the set speed, i.e., the instruction is then advantageously transmitted to the assistance system that it is to define the set speed and to which of the multiple predefined speed values it is to set the set speed. By means of this method, the assistance system is thus advantageously also instructed, in particular by open-loop and/or closed-loop control, to define the set speed, when this has been determined, more specifically to one of the multiple predefined speed values.

By means of the method according to the invention, rules are thus established, depending on the traffic state received in the vehicle and the temporal-spatial sequence of the traffic state on the route ahead, as to how parameters, in particular the set speed, of the assistance system can be set in an improved manner. By means of this method, it is determined in detail, based on the rules described above, with which parameters, in particular with which set speed, the assistance system, for example a brake assistance system and/or a distance control system and/or speed control system, is controlled by open-loop and/or closed-loop control, i.e., in particular whether, and, if so, which set speed this assistance system is to set. This decision is expediently transmitted to the assistance system, in particular as a corresponding specification or instruction, in particular control instruction, and is then implemented accordingly by the assistance system. The assistance system thus responds to the traffic states ahead. In particular, it brakes the vehicle accordingly, if necessary, in particular to the predefined set speed, i.e., to the predefined speed value of the set speed. The method thus enables in particular a traffic state-dependent brake assistance, in particular a predictive brake assistance with dynamic traffic information.

The total route length of the route ahead which is checked is, for example, at least 2.5 km, in particular at least 3 km, in particular at least 3.5 km, in particular it is greater than 3.5 km. This enables a realistic assessment of the traffic states ahead and, in particular, a timely response to these traffic states ahead by defining the speed value for the set speed accordingly, if this is required according to the mentioned criteria.

For example, a low speed value, in particular 80 km/h, a medium speed value, in particular 100 km/h, and a high speed value, in particular 120 km/h, are predefined as speed values for the set speed. In other embodiments of the method, for example, further speed values can be provided between the low and the high speed value. These different speed values allow a set speed adapted to the particular traffic state situation on the route ahead.

For example, it is decided in particular depending on a type and/or number and/or sequence and/or route length of the areas along the route whether the set speed is to be defined by the assistance system and to which of multiple predefined speed values the set speed is to be set. This decision is thus different for the various possible combinations of the traffic situation on the route ahead, adapted to the particular traffic situation. For example, if the "free-flowing traffic" traffic state is followed at a, in particular parameterizable, distance of, in particular, 2 km by the "gridlocked traffic" traffic state with vehicle standstill in less than 500 m, which value in particular is parameterizable, the set speed in the free-flowing traffic is limited to the, in particular parameterizable, low speed value of, for example, 80 km/h and the vehicle is braked accordingly. For example, if the "free-flowing traffic" traffic state is followed at a, in particular parameterizable, distance of, for example, 2 km by the "slow-moving and/or congested traffic" traffic state with low speeds and at least 500 m length, the set speed in free-flowing traffic is limited to the, in particular parameterizable, high speed value of, for example, 120 km/h and the vehicle is braked correspondingly to a lesser extent, in particular hardly at all.

For example, it is decided that the set speed is to be defined by the assistance system if, at the beginning of the checked route ahead, there is an area with the "free-flowing traffic" traffic state, the route length of which is smaller than a predefined route limit value for the area with the "free-flowing traffic" traffic state, and immediately afterwards there is an area with the "gridlocked traffic" traffic state, the route length of which is greater than a predefined route limit value for the area with the "gridlocked traffic" traffic state, or immediately afterwards there is an area with the "slow-moving and/or congested traffic" traffic state, the route length of which is greater than a predefined small route limit value for the area with the "slow-moving and/or congested traffic" traffic state, or immediately afterwards there is an area with the "slow-moving and/or congested traffic" traffic state, the route length of which is smaller than the predefined small route limit value for the area with the "slow-moving and/or congested traffic" traffic state, and immediately afterwards there is an area with the "gridlocked traffic" traffic state, the route length of which is greater than the predefined route limit value for the area with the "gridlocked traffic" traffic state, or immediately afterwards there is an area with the "slow-moving and/or congested traffic" traffic state, the route length of which is smaller than the predefined small route limit value for the area with the "slow-moving and/or congested traffic" traffic state, immediately afterwards there is an area with the "gridlocked traffic" traffic state, the route length of which is smaller than the predefined route limit value for the area with the "gridlocked traffic" traffic state, and immediately afterwards there is an area with the "slow-moving and/or congested traffic" traffic state, the route length of which is smaller than the predefined small route limit value for the area with the "slow-moving and/or congested traffic" traffic state, or immediately afterwards there is an area with the "gridlocked traffic" traffic state, the route length of which is smaller than the predefined route limit value for the area with the "gridlocked traffic" traffic state, immediately afterwards there is an area with the "slow-moving and/or congested traffic" traffic state, the route length of which is smaller than the predefined small route limit value for the area with the "slow-moving and/or congested traffic" traffic state, and immediately afterwards there is an area with the "gridlocked traffic" traffic state, the route length of which is smaller than the predefined route limit value for the area with the "gridlocked traffic" traffic state, or immediately afterwards there is an area with the "gridlocked traffic" traffic state, the route length of which is smaller than the predefined route limit value for the area with the "gridlocked traffic" traffic state, and immediately afterwards there is an area with the "slow-moving and/or congested traffic" traffic state, the route length of which is greater than the predefined small route limit value for the area with the "slow-moving and/or congested traffic" traffic state.

For these traffic situations, it makes sense for the vehicle to approach the particular traffic situation at a predefined set speed in order to avoid a collision with other vehicles driving ahead or located at the end of a tailback queue up ahead. The specification of the particular set speed and thus the reduction of the speed of the vehicle to the set speed is then expediently implemented in the area with the "free-flowing traffic" traffic state, in particular at the beginning of the checked route ahead and/or at the earliest possible time after the decision has been made.

For example, it is decided that the set speed is to be set to the low speed value, in particular 80 km/h, if, at the beginning of the checked route ahead, there is an area with the "free-flowing traffic" traffic state, the route length of which is smaller than the predefined route limit value for the area with the "free-flowing traffic" traffic state, and immediately afterwards there is an area with the "gridlocked traffic" traffic state, the route length of which is greater than the predefined route limit for the area with the "gridlocked traffic" traffic state, or immediately afterwards there is an area with the "slow-moving and/or congested traffic" traffic state, the route length of which is smaller than the predefined small route limit value for the area with the "slow-moving and/or congested traffic" traffic state, and immediately afterwards there is an area with the "gridlocked traffic" traffic state, the route length of which is greater than the predefined route limit value for the area with the "gridlocked traffic" traffic state. These traffic situations ahead require a particularly cautious approach and therefore a reduction to a low speed in order to avoid a collision with other vehicles travelling ahead or located at the end of a tailback queue up ahead.

For example, it is decided that the set speed is to be set to the medium speed value, in particular 100 km/h, if, at the beginning of the checked route ahead there is an area with the "free-flowing traffic" traffic state, the route length of which is smaller than the predefined route limit value for the area with the "free-flowing traffic" traffic state, and immediately afterwards there is an area with the "slow-moving and/or congested traffic" traffic state, the route length of which is greater than the predefined small route limit value for the area with the "slow-moving and/or congested traffic" traffic state and smaller than a predefined large route limit value for the area with the "slow-moving and/or congested traffic" traffic state, and immediately afterwards there is an area with the "gridlocked traffic" traffic state, the route length of which is greater than the predefined route limit value for the area with the "gridlocked traffic" traffic state, or immediately afterwards there is an area with the "slow-moving and/or congested traffic" traffic state, the route length of which is smaller than the predefined small route limit value for the area with the "slow-moving and/or congested traffic" traffic state, immediately afterwards there is an area with the "gridlocked traffic" traffic state, the route length of which is smaller than the predefined route limit value for the area with the "gridlocked traffic" traffic state, and immediately afterwards there is an area with the "slow-moving and/or congested traffic" traffic state, the route length of which is smaller than the predefined small route limit value for the area with the "slow-moving and/or congested traffic" traffic state, or immediately afterwards there is an area with the "gridlocked traffic" traffic state, the route length of which is smaller than the predefined route limit value for the area with the "gridlocked traffic" traffic state, immediately afterwards there is an area with the "slow-moving and/or congested traffic" traffic state, the route length of which is smaller than the predefined small route limit value for the area with the "slow-moving and/or congested traffic" traffic state, and immediately afterwards there is an area with the "gridlocked traffic" traffic state, the route length of which is smaller than the predefined route limit value for the area with the "gridlocked traffic" traffic state. Although these traffic situations ahead require a cautious approach, a slightly higher speed is possible here, and so the speed is reduced here to a medium value in order to avoid a collision with other vehicles driving ahead or located at the end of a tailback queue up ahead.

For example, it is decided that the set speed is to be set to the high speed value, in particular 120 km/h, if, at the beginning of the checked route ahead, there is an area with the "free-flowing traffic" traffic state, the route length of which is smaller than the predefined route limit value for the area with the "free-flowing traffic" traffic state, and immediately afterwards there is an area with the "slow-moving and/or congested traffic" traffic state, the route length of which is greater than the predefined small route limit value for the area with the "slow-moving and/or congested traffic" traffic state, and in particular immediately afterwards there is an area with the "free-flowing traffic" traffic state, or immediately afterwards there is an area with the "gridlocked traffic" traffic state, the route length of which is smaller than the predefined route limit value for the area with the "gridlocked traffic" traffic state, immediately afterwards there is an area with the "slow-moving and/or congested traffic" traffic state, the route length of which is greater than the predefined small route limit value for the area with the "slow-moving and/or congested traffic" traffic state, and in particular immediately afterwards there is an area with the "free-flowing traffic" traffic state, or immediately afterwards there is an area with the "slow-moving and/or congested traffic" traffic state, the route length of which is greater than the predefined small route limit value for the area with the "slow-moving and/or congested traffic" traffic state, immediately afterwards there is an area with the "gridlocked traffic" traffic state, the route length of which is smaller than the predefined route limit value for the area with the "gridlocked traffic" traffic state, and in particular immediately afterwards there is an area with the "free-flowing traffic" traffic state. Although these traffic situations ahead require a relatively cautious approach, a relatively high speed is still possible here, and so the speed is reduced to a higher value here in order to avoid a collision with other vehicles driving ahead or located at the end of a tailback queue up ahead.

The predefined route limit value for the area with the "free-flowing traffic" traffic state is, for example, 2 km. This prevents the set speed from being too prematurely defined and set to the appropriate predefined speed value, and thus prevents premature braking of the vehicle. Such a very early braking of the vehicle could, for example, lead to a lack of acceptance by a vehicle driver, as the driver cannot see why the vehicle is being braked. For example, this could also lead to an unnecessary increase in driving time and, for example, also to an unnecessary braking of the vehicle if the traffic situation ahead has already changed again during the unnecessarily slow approach of the vehicle. These problems are avoided in the manner described above.

The predefined small route limit value for the area with the "slow-moving and/or congested traffic" traffic state is, for example, 500 m. This makes it possible to distinguish between relatively short areas with slow-moving and/or congested traffic, which, for example, may have already dissipated during the further approach of the vehicle, and longer such areas and to predefine the set speed accordingly.

The predefined large route limit value for the area with the "slow-moving and/or congested traffic" traffic state is, for example, 1 km. This allows the set speed to be adapted accordingly, in particular to such a relatively long area with the "slow-moving and/or congested traffic" traffic state, which is then followed by an area with gridlocked traffic, for example.

The predefined route limit value for the area with the "gridlocked traffic" traffic state is, for example, 500 m. This makes it possible to distinguish between relatively short areas with gridlocked traffic, which, for example, may have already dissipated during the further approach of the vehicle, and longer such areas and to predefine the set speed accordingly.

In a possible embodiment of the method, it can be provided that the total route length and/or the speed values for the set speed and/or the route limit value for the area with the "free-flowing traffic" traffic state and/or the small route limit value for the area with the "slow-moving and/or congested traffic" traffic state and/or the large route limit value for the area with the "slow-moving and/or congested traffic" traffic state and/or the route limit value for the area with the "gridlocked traffic" traffic state can be predefined by a vehicle owner and/or vehicle possessor and/or vehicle user and/or by a technical device external to the vehicle, in particular by a server external to the vehicle, in particular by a technical device, external to the vehicle, of a manufacturer of the vehicle. In the case of specification by the technical device external to the vehicle, this is implemented in particular wirelessly, in particular via a radio connection, in particular via an Internet connection. This makes it possible, for example, to adapt one or more of the above-mentioned parameters to individual requirements. Alternatively, or additionally, it can thus be provided, for example, that the speed values for the set speed, to which in particular the vehicle is to be braked, are transmitted temporally-spatially via such a technical device external to the vehicle, for example via the server external to the vehicle, in particular via a cloud-based service. In this way, for example, specific country characteristics, in particular specific stipulations of the country in which the vehicle is currently located, for example speed limits, and/or for example route-specific speed limits, can be taken into account. Alternatively, or additionally, via such a technical device external to the vehicle, for example via the server external to the vehicle, in particular via the cloud-based service, test results from fleet data and/or feedback from other vehicle users can, for example, also flow into the specification of the speed values for the set speed, i.e., can be taken into account for this purpose. In this way, for example, more speed values can be predefined, in particular additional speed values between the low and high speed value, in order to thus allow a more differentiated specification of the particular set speed. For example, speed values for the set speed in 5 km/h intervals are possible.

In a possible embodiment of the method, it can be provided, for example, that a decision is additionally made, depending on sensor data of an environment detection sensor system of the vehicle, as to whether the set speed is to be defined by the assistance system and to which of multiple predefined speed values the set speed is to be set. In this way, an incorrect setting of the set speed and thus, for example, an unnecessary braking of the vehicle when there is little traffic in the environment of the vehicle or an insufficient braking of the vehicle when there is already a high volume of traffic in the environment of the vehicle can be avoided. The set speed defined by the assistance system is then compared, for example, with a list of objects in the environment of the vehicle known from sensors, for example camera and radar, of the vehicle's environment detection sensor system in order to avoid incorrect and excessive braking interventions, for example if the traffic is so light that there are no other vehicles in the environment, or if, on the contrary, it is determined, for example on the basis of multiple overtaking objects, that there is already dense traffic in the environment of the vehicle.

For implementation, the vehicle advantageously has a navigation system with dynamic route calculation and route forecast. The route forecast in this case is, for example, a traffic-state-dependent route forecast, for example according to DE 10 2009 059 128 A1. Advantageously, the vehicle has a communication device to the technical device external to the vehicle, in particular to an Internet backend. Advantageously, the vehicle can process control suggestions, i.e., specifications or instructions, in particular control instructions, for the assistance system, for example for the brake assistance system and/or the distance control system and/or the speed control system, in particular the decision regarding the set speed made by means of the method.

In addition to the criteria described above for deciding whether the set speed is to be defined by the assistance system and to which of multiple predefined speed values the set speed is to be set, it can be provided, for example, that an active tailback warning ("Danger! Queue ahead."), in particular with an acoustic warning output, is also taken into account. If such a tailback warning occurs, it may be provided, for example, that it is then decided that the set speed is to be defined by the assistance system and that it is to be set to a predefined very low speed value of, for example, 60 km/h. For example, it can be provided that this very low speed value is parameterizable, i.e., can be predefined, for example, by the vehicle owner and/or vehicle possessor and/or vehicle user and/or by the technical device external to the vehicle, in particular by the server external to the vehicle, in particular by the technical device, external to the vehicle, of the manufacturer of the vehicle.

For example, a position of the front end of a determined, dangerous tailback queue can be integrated into a look-ahead traffic state message according to DE 10 2009 059 128 A1.

Alternatively, or additionally to the decision described above as to whether the set speed is to be defined by the assistance system and to which of multiple predefined speed values the set speed is to be set, and in particular transmission of this decision to the assistance system, an active braking recommendation can be output, for example by means of a visual, in particular graphic, and/or acoustic and/or haptic message, instead of the decision to set the set speed or in addition thereto. This is advantageous, for example, for vehicles that do not have a corresponding assistance system, in particular no brake assistance system and/or no distance control system and/or speed control system.

The method described above can be provided, for example, for a manual driving operation, i.e., driving carried out entirely by a vehicle driver, for a driving operation supported by one or more assistance systems, for a semi-automated driving operation, for a fully automated driving operation and/or for an autonomous driving operation, i.e., advantageously for all variants of driving operation.

For example, it is provided that the function of predictive braking realized or realizable by means of the method, i.e., the automatic setting of a set speed which deviates, for example, from a set speed predefined by the vehicle user and/or vehicle driver, is displayed to the vehicle user and/or vehicle driver, for example in an instrument cluster of the vehicle. In this way, the vehicle user and/or vehicle driver is informed about and not irritated by, for example, a braking of the vehicle, although a larger volume of traffic is not yet in sight for the vehicle user and/or vehicle driver.

Exemplary embodiments of the invention are explained in more detail below with reference to drawings.

BRIEF DESCRIPTION OF THE DRAWING FIGURES

The drawings show.

Corresponding parts are provided with the same reference signs in all figures.

DETAILED DESCRIPTION

A method for determining a set speed VS of an assistance system for controlling a longitudinal movement of a vehicle is explained below in connection with FIGS. 1-4. The set speed VS is a predefinable target speed to which the speed of the vehicle is controlled, provided the vehicle does not drive too close to a vehicle ahead as a result of the control. In particular, the vehicle does not drive too close to the vehicle ahead if the distance to the vehicle ahead does not fall below a predefinable distance. In this method, a route FS ahead of the vehicle with a predefined total route length is checked to determine whether, on this total route length, there are areas with a "free-flowing traffic" traffic state FV, areas with a "slow-moving and/or congested traffic" traffic state ZSV and/or areas with a "gridlocked traffic" traffic state GV, and a route length LFV, LGV, LZSV of each area is determined. Depending on this, a decision is made as to whether the set speed VS is to be defined by the assistance system, and, if so, to which of multiple predefined speed values VSN, VSM, VSH the set speed VS is to be set.

FIGS. 1 to 4 to this end each show the route FS ahead of the vehicle with the predefined total route length, wherein various combinations of the above-mentioned areas with the various traffic states FV, ZSV, GV are present on the shown routes FS.

Figure 1:
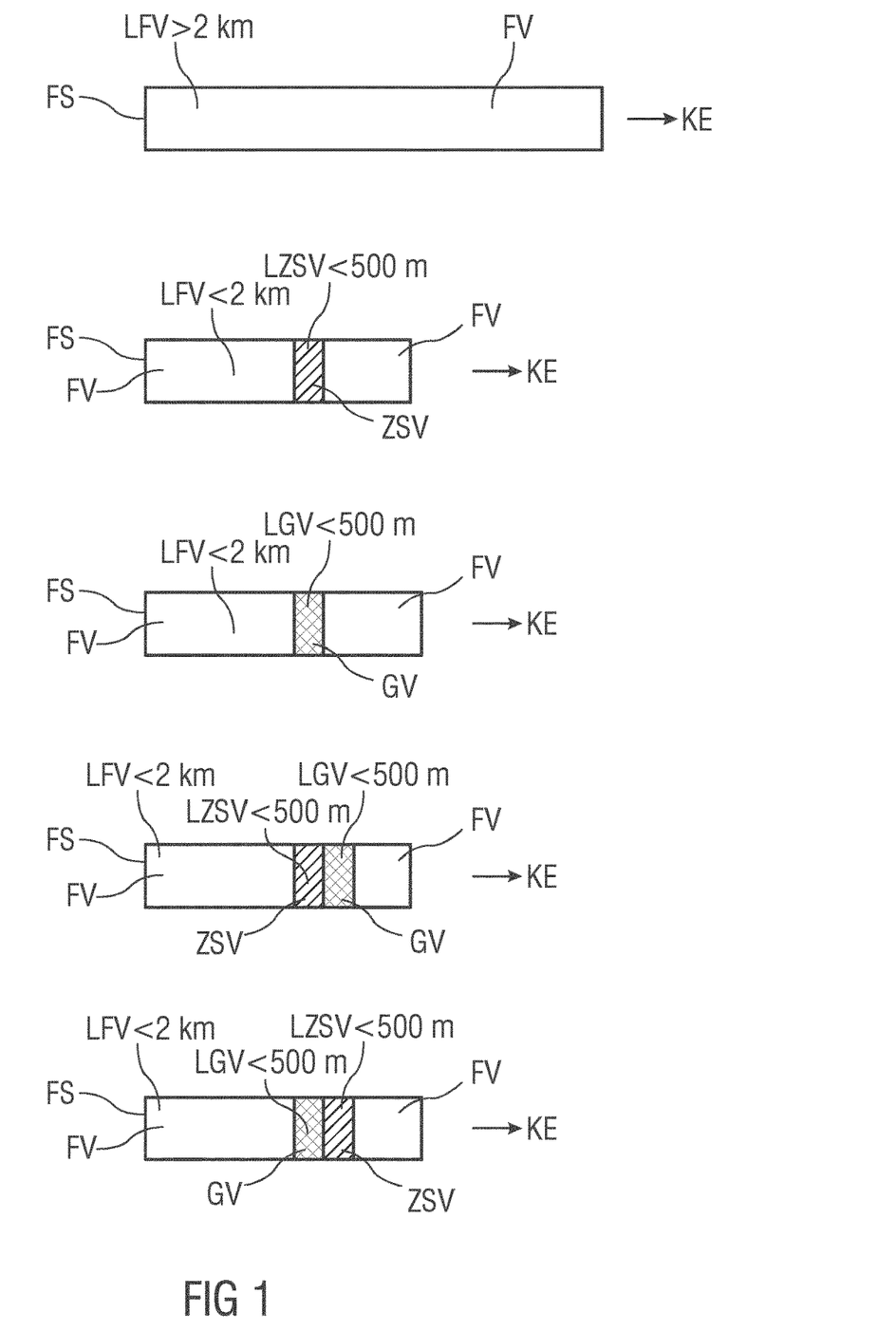
FIG. 1 schematically different combinations of traffic states on a route ahead of a vehicle, for each of which no intervention for defining a set speed is provided, FIG. 2 schematically different combinations of traffic states on a route ahead of a vehicle, for each of which a set speed with a low predefined speed value is provided, FIG. 3 schematically different combinations of traffic states on a route ahead of a vehicle, for each of which a set speed with a medium predefined speed value is provided, and FIG. 4 schematically different combinations of traffic states on a route ahead of a vehicle, for each of which a set speed with a high predefined speed value is provided.

FIG. 1 shows combinations of the above-mentioned areas with the various traffic states FV, ZSV, GV, for each of which no intervention KE for defining the set speed VS is provided. This means that it is decided in each case that the set speed VS is not to be defined by the assistance system.

Figure 2:
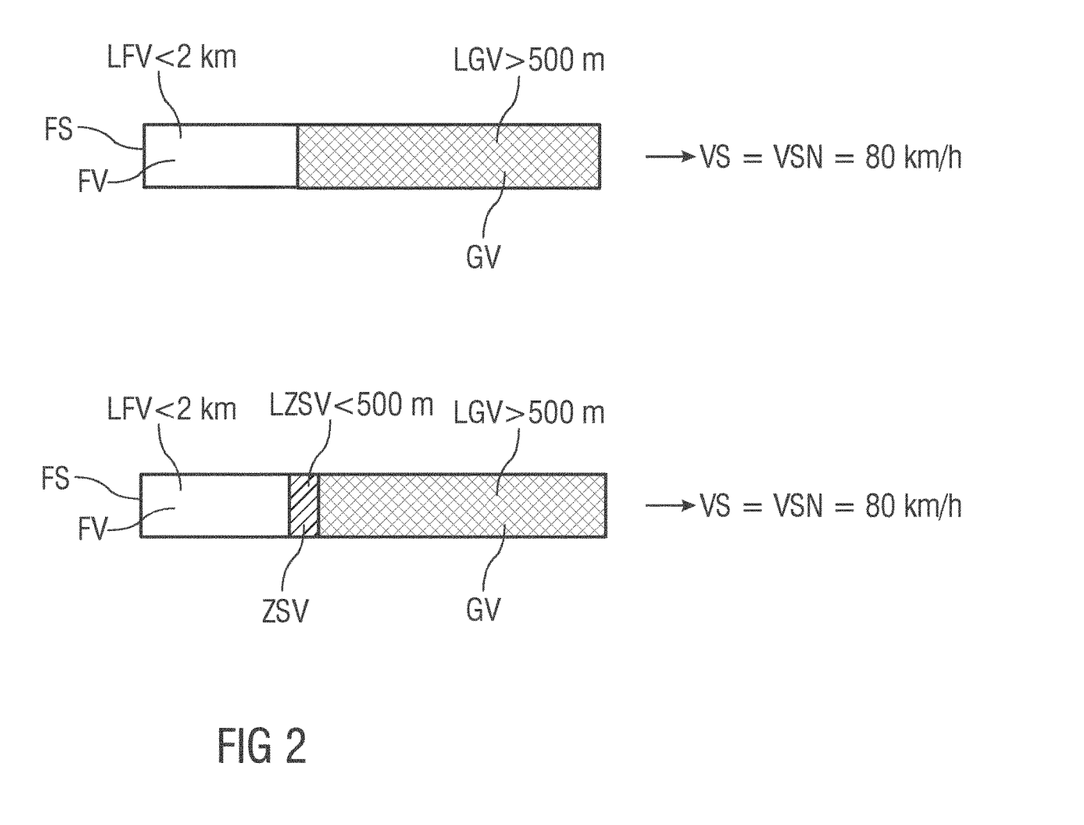
Figure 3:
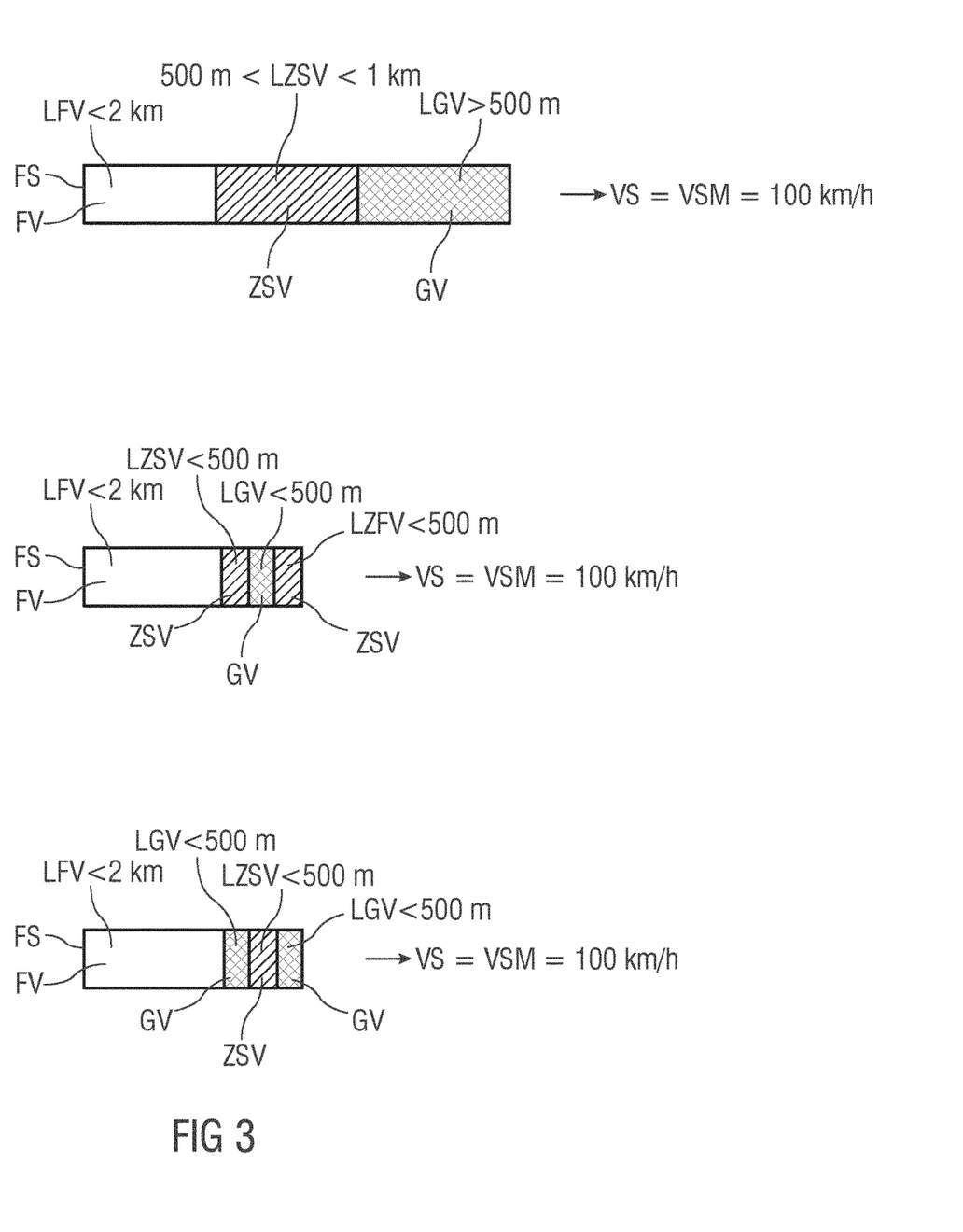
Figure 4:
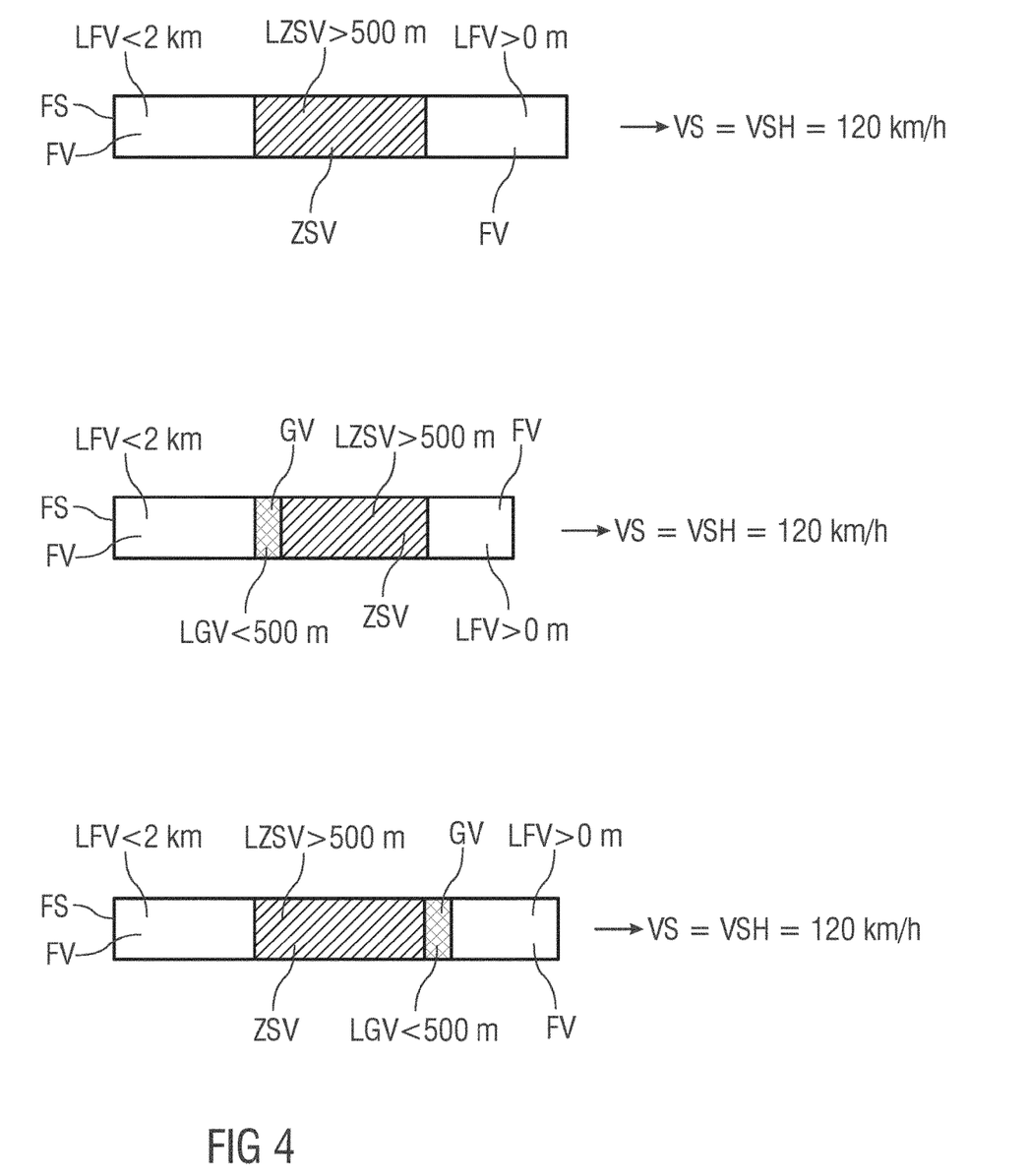

FIGS. 2 to 4 each show combinations of the above-mentioned areas with the various traffic states FV, ZSV, GV, for which a set speed VS is provided in each case. In other words, it is decided in each case that the set speed VS is to be defined by the assistance system, and it is also decided to which of multiple predefined speed values VSN, VSM, VSH the set speed VS is to be set. In the case of the various combinations of the above-mentioned areas with the various traffic states FV, ZSV, GV shown in FIG. 2, it is decided that the set speed VS is to be set to a low predefined speed value VSN of, in this example, 80 km/h. In the case of the various combinations of the above-mentioned areas with the various traffic states FV, ZSV, GV shown in FIG. 3, it is decided that the set speed VS is to be set to a medium predefined speed value VSM of, in this example, 100 km/h. In the various combinations of the above-mentioned areas with the various traffic state FV, ZSV, GV shown in FIG. 4, it is decided that the set speed VS is to be set to a high predefined speed value VSH of, in this example, 120 km/h.

In the example shown according to FIGS. 2 to 4, it is decided that the set speed VS is to be set by the assistance system if, at the beginning of the checked route FS ahead, there is an area with the "free-flowing traffic" traffic state FV, the route length LFV of which is smaller than a predefined route limit value of, in this example, 2 km for the area with the "free-flowing traffic" traffic state FV, and
- immediately afterwards there is an area with the "gridlocked traffic" traffic state GV, the route length LGV of which is greater than a predefined route limit value of, in this example, 500 m for the area with the "gridlocked traffic" traffic state GV, as shown in FIG. 2 above, or
- immediately afterwards there is an area with the "slow-moving and/or congested traffic" traffic state ZSV, the route length LZSV of which is greater than a predefined small route limit value of, in this example, 500 m for the area with the "slow-moving and/or congested traffic" traffic state ZSV, as shown in FIG. 3 at the top and in FIG. 4 at the top and bottom, or
- immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, and immediately afterwards there is an area with the "gridlocked traffic" traffic state GV, the route length LGV of which is greater than the predefined route limit value of, in this example, 500 m for the area with the "gridlocked traffic" traffic state GV, as shown in FIG. 2 at the bottom, or
- immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, immediately afterwards there is an area with the "gridlocked traffic" traffic state GV, the route length LGV of which is smaller than the predefined small route limit value of, in this example, 500 m for the area with the "gridlocked traffic" traffic state GV, and immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, as shown in FIG. 3 in the middle, or
- immediately afterwards there is an area with the "gridlocked traffic" traffic state GV, the route length LGV of which is smaller than the predefined route limit value of, in this example, 500 m for the area with the "gridlocked traffic" traffic state GV, immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, and immediately afterwards there is an area with the "gridlocked traffic" traffic state GV, the route length LGV of which is smaller than the predefined route limit value of, in this example, 500 m for the area with the "gridlocked traffic" traffic state GV, as shown in FIG. 3 at the bottom, or
- immediately afterwards there is an area with the "gridlocked traffic" traffic state GV, the route length LGV of which is smaller than the predefined route limit value of, in this example, 500 m for the area with the "gridlocked traffic" traffic state GV, and immediately afterwards there is an area with the "slow-moving and/or congested traffic" traffic state ZSV, the route length LZSV of which is greater than the predefined small route limit value of, in this example, 500 m for the area with the "slow-moving and/or congested traffic" traffic state ZSV, as shown in FIG. 4 in the middle.

Advantageously, in all other cases it is decided that the set speed VS is not to be defined by the assistance system, i.e., that no intervention KE is to take place for defining the set speed VS. This applies in particular to the combinations of the stated areas with the various traffic states FV, GV, ZSV shown by way of example in FIG. 1.

In FIG. 1 at the top, there is only one area with the "free-flowing traffic" traffic state FV, the route length LFV of which is greater than the predefined route limit value of, in this example, 2 km for the area with the "free-flowing traffic" traffic state FV. Here it is decided that the set speed VS is not to be defined by the assistance system.

In FIG. 1, second example from the top, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, and immediately afterwards there is a further area with the "free-flowing traffic" traffic state FV. Here it is decided that the set speed VS is not to be defined by the assistance system.

In FIG. 1 in the middle, at the beginning of the checked route FS ahead, there is an area with the "free-flowing traffic" traffic state FV, the route length LFV of which is smaller than the predefined route limit value of, in this example, 2 km for the area with the "free-flowing traffic"

traffic state FV, immediately afterwards there is an area with the "gridlocked traffic" traffic state GV, the route length LGV of which is smaller than the predefined route limit value of, in this example, 500 m for the area with the "gridlocked traffic" traffic state GV, and immediately afterwards there is a further area with the "free-flowing traffic" traffic state FV. Here it is decided that the set speed VS is not to be defined by the assistance system.

In FIG. 1, second example from the bottom, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, immediately afterwards there is an area with the "gridlocked traffic" traffic state GV, the route length LGV of which is smaller than the predefined route limit value of, in this example, 500 m for the area with the "gridlocked traffic" traffic state GV, and immediately afterwards there is a further area with the "free-flowing traffic" traffic state FV. Here it is decided that the set speed VS is not to be defined by the assistance system.

In FIG. 1 at the bottom, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "gridlocked traffic" traffic state GV, the route length LGV of which is smaller than the predefined route limit value of, in this example, 500 m for the area with the "gridlocked traffic" traffic state GV, immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, and immediately afterwards there is a further area with the "free-flowing traffic" traffic state FV. Here it is decided that the set speed VS is not to be defined by the assistance system.

As already mentioned above, FIGS. 2 to 4 show combinations of the above-mentioned areas with the various traffic states FV, GV, ZSV, for which a set speed VS is provided in each case. In other words, it is decided here in each case that the set speed VS is to be defined by the assistance system, and it is also decided to which of multiple predefined speed values VSN, VSM, VSH the set speed VS is to be set.

In FIG. 2 at the top, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, and immediately afterwards there is an area with the "gridlocked traffic" traffic state GV, the route length LGV of which is greater than the predefined route limit value of, in this example, 500 m for the area with the "gridlocked traffic" traffic state GV. Here it is decided that the set speed VS is to be set to the low predefined speed value VSN of, in this example, 80 km/h.

In FIG. 2 at the bottom, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, and immediately afterwards there is an area with the "gridlocked traffic" traffic state GV, the route length LGV of which is greater than the predefined route limit value of, in this example, 500 m or the area with the "gridlocked traffic"" traffic state GV. Here it is decided that the set speed VS is to be set to the low predefined speed value VSN of, in this example, 80 km/h.

In FIG. 3 at the top, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "slow-moving and/or congested traffic" traffic state ZSV, the route length LZSV of which is greater than the predefined small route limit value of, in this example, 500 m for the area with the "slow-moving and/or congested traffic" traffic state ZSV and is smaller than a predefined large route limit value of, in this example, 1 km for the area with the "slow-moving and/or congested traffic" traffic state ZSV, and immediately afterwards there is an area with the "gridlocked traffic" traffic state GV, the route length LGV of which is greater than the predefined route limit value of, in this example, 500 m for the area with the "gridlocked traffic" traffic state GV. Here it is decided that the set speed VS is to be set to the medium predefined speed value VSM of, in this example, 100 km/h.

In the middle of FIG. 3, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, immediately afterwards there is an area with the "gridlocked traffic" traffic state GV, the route length LGV of which is smaller than the predefined route limit value of, in this example, 500 m for the area with the "gridlocked traffic" traffic state GV, and immediately afterwards there is a further area with the "slow-moving and/or congested traffic" traffic state ZSV, the route length LZSV of which is smaller than the predefined small route limit value of, in this example, 500 m for the area with the "slow-moving and/or congested traffic" traffic state ZSV. Here it is decided that the set speed VS is to be set to the medium predefined speed value VSM of, in this example, 100 km/h.

In FIG. 3 at the bottom, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "gridlocked traffic" traffic state GV, the route length LGV of which is smaller than the predefined route limit value of, in this example, 500 m for the area with the "gridlocked traffic" traffic state GV, immediately afterwards there is an area with the "slow-moving and/or congested traffic" traffic state ZSV, the route length LZSV of which is smaller than the predefined small route limit value of, in this example, 500 m for the area with the "slow-moving and/or congested traffic" traffic state ZSV, and immediately afterwards there is a further area with the "gridlocked traffic" traffic state GV, the route length LGV of which is smaller than the predefined route limit value of, in this example, 500 m for the area with the "gridlocked traffic" traffic state GV. Here it is decided that the set speed VS is to be set to the medium predefined speed value VSM of, in this example, 100 km/h.

In FIG. 4 at the top, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "slow-moving and/or congested traffic" traffic state ZSV, the route length LZSV of which is greater than the predefined small route limit value of, in this example, 500 m for the area with the "slow-moving and/or congested traffic" traffic state ZSV, and, in the example shown, immediately afterwards there is a further area with the "free-flowing traffic" traffic state FV, the route length LFV of which is greater than 0 m. Here it is decided that the set speed VS is to be set to the high predefined speed value VSH of, in this example, 120 km/h.

In the middle of FIG. 4, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "gridlocked traffic" traffic state GV, the route length LGV of which is smaller than the predefined route limit value of, in this example, 500 m for the area with the "gridlocked traffic" traffic state GV, immediately afterwards there is an area with the "slow-moving and/or congested traffic" traffic state ZSV, the route length LZSV of which is greater than the predefined small route limit value of, in this example, 500 m for the area with the "slow-moving and/or congested traffic" traffic state ZSV, and, in the example shown, immediately afterwards there is a further area with the "free-flowing traffic" traffic state FV, the route length LFV of which is greater than 0 m. Here it is decided that the set speed VS is to be set to the high predefined speed value VSH of, in this example, 120 km/h.

In FIG. 4 at the bottom, at the beginning of the checked route FS ahead, there is an area with the "free-flowing traffic" traffic state FV, the route length LFV of which is smaller than the predefined route limit value of, in this example, 2 km for the area with the "free-flowing traffic" traffic state FV, immediately afterwards there is an area with the "slow-moving and/or congested traffic" traffic state ZSV, the route length LZSV of which is greater than the predefined small route limit value of, in this example, 500 m for the area with the "slow-moving and/or congested traffic" traffic state ZSV, immediately afterwards there is an area with the "gridlocked traffic" traffic state GV, the route length LGV of which is smaller than the predefined route limit value of, in this example, 500 m for the area with the "gridlocked traffic" traffic state GV, and, in the example shown, immediately afterwards there is an area with the "free-flowing traffic" traffic state FV, the route length LFV of which is greater than 0 m. Here it is decided that the set speed VS is to be set to the high predefined speed value VSH of, in this example, 120 km/h.

As already mentioned above, in the example described here, the predefined route limit value for the area with the "free-flowing traffic" traffic state FV is 2 km, the predefined small route limit value for the area with the "slow-moving and/or congested traffic" traffic state ZSV is 500 m, the predefined large route limit value for the area with the "slow-moving and/or congested traffic" traffic state ZSV is 1 km, and the predefined route limit value for the area with the "gridlocked traffic" traffic state GV is 500 m. In other exemplary embodiments, other values are also possible for the various route limit values.

As mentioned above, in the example described here, a low speed value VSN, a medium speed value VSM and a high speed value VSH are provided as speed values VSN, VSM, VSH for the set speed VS. In other exemplary embodiments, for example, further speed values can also be provided between the low speed value VSN and the high speed value VSH. In the example described here, the low speed value VSN is 80 km/h, the medium speed value VSM is 100 km/h and the high speed value VSH is 120 km/h. In other exemplary embodiments, other values are also possible for the various speed values VSN, VSM, VSH.

In a possible embodiment of the method, it can be provided that the total route length and/or the speed values VSN, VSM, VSH for the set speed VS and/or the route limit value for the area with the "free-flowing traffic" traffic state FV and/or the small route limit value for the area with the "slow-moving and/or congested traffic" traffic state ZSV and/or the large route limit value for the area with the "slow-moving and/or congested traffic" traffic state ZSV and/or the route limit value for the area with the "gridlocked traffic" traffic state GV can be predefined by a vehicle owner and/or vehicle possessor and/or vehicle user and/or by a technical device external to the vehicle, in particular by a server external to the vehicle, in particular by a technical device, external to the vehicle, of a manufacturer of the vehicle.

For example, it can be provided that the speed values VSN, VSM, VSH for the set speed VS, to which in particular the vehicle is to be braked, are transmitted temporally-spatially via such a technical device external to the vehicle, for example via the server external to the vehicle, in particular via a cloud-based service. In this way, for example, specific country characteristics, in particular specific stipulations of the country in which the vehicle is currently located, for example speed limits, and/or for example route-specific speed limits, can be taken into account. Alternatively, or additionally, via such a technical device external to the vehicle, for example via the server external to the vehicle, in particular via the cloud-based service, test results from fleet data and/or feedback from other vehicle users can, for example, also flow into the specification of the speed values VSN, VSM, VSH for the set speed VS, i.e., can be taken into account for this purpose. In this way, for example, more speed values can be predefined, in particular additional speed values between the low speed value VSN and the high speed value VSH, in order to thus allow a more differentiated specification of the particular set speed VS. For example, speed values for the set speed VS in 5 km/h intervals are possible.

In a possible embodiment of the method, it can be provided, for example, that a decision is additionally made, depending on sensor data of an environment detection sensor system of the vehicle, as to whether the set speed VS is to be defined by the assistance system and to which of multiple predefined speed values VSN, VSM, VSH the set speed VS is to be set. In this way, an incorrect setting of the set speed VS and thus, for example, an unnecessary braking of the vehicle when there is little traffic in the environment of the vehicle or an insufficient braking of the vehicle when there is already a high volume of traffic in the environment of the vehicle can be avoided. The set speed VS defined by the assistance system is then compared, for example, with a list of objects in the environment of the vehicle known from sensors, for example camera and radar, of the vehicle's environment detection sensor system in order to avoid incorrect and excessive braking interventions, for example if the traffic is so light that there are no other vehicles in the environment, or if, on the contrary, it is determined, for example on the basis of multiple overtaking objects, that there is already dense traffic in the environment of the vehicle.

In addition to the criteria described above for deciding whether the set speed VS is to be defined by the assistance system and to which of multiple predefined speed values VSN, VSM, VSH the set speed VS is to be set, it can be provided, for example, that an active tailback warning ("Danger! Queue ahead."), in particular with an acoustic warning output, is also taken into account. If such a tailback warning occurs, it may be provided, for example, that it is then decided that the set speed VS is to be defined by the assistance system and that it is to be set to a predefined very low speed value of, for example, 60 km/h. For example, it can be provided that this very low speed value is parameterizable, i.e., can be predefined, for example, by the vehicle owner and/or vehicle possessor and/or vehicle user and/or by the technical device external to the vehicle, in particular by the server external to the vehicle, in particular by the technical device, external to the vehicle, of the manufacturer of the vehicle.

Alternatively or additionally to the decision described above as to whether the set speed VS is to be defined by the assistance system and to which of multiple predefined speed values VSN, VSM, VSH the set speed VS is to be set, and in particular transmission of this decision to the assistance system, an active braking recommendation can be output, for example by means of a visual, in particular graphic, and/or acoustic and/or haptic message, instead of the decision to set the set speed VS or in addition thereto. This is advantageous, for example, for vehicles that do not have a corresponding assistance system, in particular no brake assistance system and/or no distance control system and/or speed control system.

The method described above can be provided, for example, for a manual driving operation, i.e., driving carried out entirely by a vehicle driver, for a driving operation supported by one or more assistance systems, for a semi-automated driving operation, for a fully automated driving operation, and/or for an autonomous driving operation, i.e., advantageously for all variants of driving operation.

For example, it is provided that the function of predictive braking realized or realizable by means of the method, i.e., the automatic setting of a set speed VS which deviates, for example, from a set speed predefined by the vehicle user and/or vehicle driver, is displayed to the vehicle user and/or vehicle driver, for example in an instrument cluster of the vehicle. In this way, the vehicle user and/or vehicle driver is informed about and not irritated by, for example, a braking of the vehicle, although a larger volume of traffic is not yet in sight for the vehicle user and/or vehicle driver.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for determining a set speed of an assistance system for controlling a longitudinal movement of a vehicle,
    checking a route ahead of the vehicle with a predefined total route length to identify whether, on the route, there are
        areas with a free-flowing traffic state,
        areas with a slow-moving and/or congested traffic state,
        areas with a gridlocked traffic state,
    determining, for each identified areas with free-flowing, slow-moving and/or congested, and gridlocked traffic states, a route length; and
    determining whether the set speed is to be set by the assistance system and to which of a plurality of predefined speed values the set speed is to be set based on the identified areas with free-flowing, slow-moving and/or congested, and gridlocked traffic states and the determined route length for each of the areas with free-flowing, slow-moving and/or congested, and gridlocked traffic states.

2. The method of claim 1, wherein the predetermined total route length is at least 2.5 km.

3. The method of claim 1, wherein the plurality of predefined speed values comprises a low speed value of 80 km/h, a medium speed value of 100 km/h, and a high speed value of 120 km/h.

4. The method of claim 3, wherein the set speed is set to the low speed value, when, at a beginning of the checked route ahead there is an area with the free-flowing traffic state having a route length that is smaller than a predefined route limit value for the area with the free-flowing traffic state, and when
    immediately after the area with the free-flowing traffic state there is an area with the gridlocked traffic state having a route length that is greater than a predefined route limit for the area with the gridlocked traffic state, or
    immediately after the area with the free-flowing traffic state there is an area with the slow-moving and/or congested traffic state having a route length that is smaller than a predefined small route limit value for the area with the slow-moving and/or congested traffic state, and immediately after the area with the slow-moving and/or congested traffic state there is an area with the gridlocked traffic state having a route length that is greater than the predefined route limit value for the area with the gridlocked traffic state.

5. The method of claim 3, wherein the set speed is set to the medium speed value when, at a beginning of the checked route ahead, there is an area with the free-flowing traffic state having a route length that is smaller than a predefined route limit value for the area with the free-flowing traffic state, and when
- immediately after the area with the free-flowing traffic state there is an area with the slow-moving and/or congested traffic state, the route length of which is greater than the predefined small route limit value for the area with the slow-moving and/or congested traffic state and smaller than a predefined large route limit value for the area with the slow-moving and/or congested traffic state, and immediately afterwards there is an area with the gridlocked traffic state, the route length of which is greater than the predefined route limit value for the area with the gridlocked traffic state, or
- immediately after the area with the free-flowing traffic state there is an area with the slow-moving and/or congested traffic state having a route length that is smaller than a predefined small route limit value for the area with the slow-moving and/or congested traffic state, immediately after the area with the slow-moving-and/or congested traffic state there is an area with the gridlocked traffic state having a route length that is smaller than the predefined route limit value for the area with the gridlocked traffic state, and immediately after the area with the gridlocked traffic state there is another area with the slow-moving and/or congested traffic state, wherein the another area with the slow-moving and/or congested traffic state has a route length that is smaller than the predefined small route limit value for the area with the slow-moving and/or congested traffic state, or
- immediately after the area with the free-flowing traffic state there is an area with the gridlocked traffic state having a route length that is smaller than the predefined route limit value for the area with the gridlocked traffic state, immediately after the area with the gridlocked traffic state there is an area with the slow-moving and/or congested traffic state having a route length that is smaller than the predefined small route limit value for the area with the slow-moving and/or congested traffic state, and immediately after the area with the slow-moving and/or congested traffic state there is another area with the gridlocked traffic state, wherein the another area with the gridlocked traffic state has a route length that is smaller than the predefined route limit value for the area with the gridlocked traffic state.

6. The method of claim 3, wherein the set speed is set to the high speed value, when, at a beginning of the checked route ahead, there is an area with the free-flowing traffic state having a route length that is smaller than the predefined route limit value for the area with the free-flowing traffic state, and when
- immediately after the area with the free-flowing traffic state there is an area with the slow-moving and/or congested traffic state having a route length that is greater than a predefined small route limit value for the area with the slow-moving and/or congested traffic state, and immediately after the area with the slow-moving and/or congested traffic state there is another area with the free-flowing traffic state, or
- immediately after the area with the free-flowing traffic state there is an area with the gridlocked traffic state having a route length that is smaller than a predefined route limit value for the area with the gridlocked traffic state, immediately after the area with the gridlocked traffic state there is an area with the slow-moving and/or congested traffic state having a route length that is greater than the predefined small route limit value for the area with the slow-moving and/or congested traffic state, and immediately after the area with the slow-moving and/or congested traffic state there is another area with the free-flowing traffic state, or
- immediately after the area with the free-flowing traffic state there is an area with the slow-moving and/or congested traffic state having a route length that is greater than the predefined small route limit value for the area with the slow-moving and/or congested traffic state, immediately after the area with the slow-moving and/or congested traffic state there is an area with the gridlocked traffic state having a route length of which is smaller than the predefined route limit value for the area with the gridlocked traffic state, and immediately after the area with the gridlocked traffic state there is another area with the free-flowing traffic state.

7. The method of claim 1, wherein it is determined that the set speed is to be defined by the assistance system when, at a beginning of the checked route ahead, there is an area with the free-flowing traffic state having a route length that is smaller than a predefined route limit value for the area with the free-flowing traffic state, and when
- immediately after the area with the free-flowing traffic state there is an area with the gridlocked traffic state with a route length that is greater than a predefined route limit value for the area with the gridlocked traffic state, or
- immediately after the area with the free-flowing traffic state there is an area with the slow-moving and/or congested traffic state having a route length greater than a predefined small route limit value for the area with the slow-moving and/or congested traffic state, or
- immediately after the area with the free-flowing traffic state there is an area with the slow-moving and/or congested traffic state having a route length that is smaller than the predefined small route limit value for the area with the slow-moving and/or congested traffic state, and immediately after the slow-moving and/or congested traffic state there is an area with the gridlocked traffic state having a route length that is greater than the predefined route limit value for the area with the gridlocked traffic state, or
- immediately after the area with the free-flowing traffic state there is an area with the slow-moving and/or congested traffic state having a route length that is smaller than the predefined small route limit value for the area with the slow-moving and/or congested traffic state, immediately after the area with the slow-moving and/or congested traffic state there is an area with the gridlocked traffic state having a route length that is smaller than the predefined route limit value for the area with the gridlocked traffic state, and immediately after the area with the gridlocked traffic state there is an area with the slow-moving and/or congested traffic state having a route length that is smaller than the predefined small route limit value for the area with the slow-moving and/or congested traffic state, or
- immediately after the area with the free-flowing traffic state there is an area with the gridlocked traffic state having a route length that is smaller than the predefined route limit value for the area with the gridlocked traffic state, immediately after the area with the gridlocked traffic states there is an area with the slow-moving and/or congested traffic state having a route length that is smaller than the predefined small route limit value for the area with the slow-moving and/or congested traffic state, and immediately after the area with the slow-moving and/or congested traffic state there is another area with the gridlocked traffic state, wherein the another area with the gridlocked traffic state has a route length that is smaller than the predefined route limit value for the area with the gridlocked traffic state, or immediately after the area with the free-flowing traffic state there is an area with the gridlocked traffic state having a route length that is smaller than the predefined route limit value for the area with the gridlocked traffic state, and immediately after the area with the gridlocked traffic state there is an area with the slow-moving and/or congested traffic state having a route length that is greater than the predefined small route limit value for the area with the slow-moving and/or congested traffic state.

8. The method of claim 7, wherein the predefined route limit value for the area with the free-flowing traffic state is 2 km, the predefined small route limit value for the area with the slow-moving and/or congested traffic state is 500 m, the predefined large route limit value for the area with the slow-moving and/or congested traffic state is 1 km, or the predefined route limit for the area with the gridlocked traffic state is 500 m.

9. The method of claim 1, further comprising:

predefining, by a vehicle owner, vehicle possessor, vehicle user or a server external to the vehicle, at least one of the predefined total route length, speed values for the set speed, a route limit value for the area with the free-flowing traffic state, a small route limit value for the area with the slow-moving and/or congested traffic state, a large route limit value for the area with the slow-moving and/or congested traffic state, and a route limit value for the area with the gridlocked traffic state.

10. The method of claim 1, wherein the determination of whether the set speed is to be set by the assistance system and which of the plurality of predefined speed values are set as the set speed is also based on sensor data of an environment detection sensor system of the vehicle.

* * * * *